May 8, 1951     A. M. SLOAN     2,551,908
ANIMAL TRAP
Filed Aug. 31, 1948
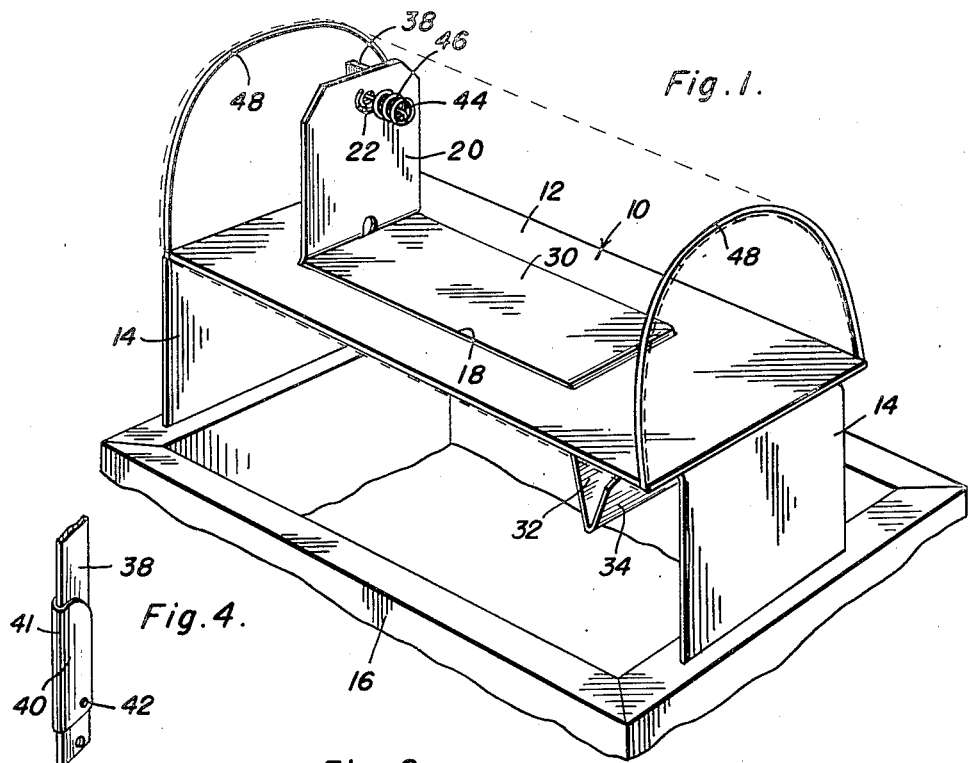
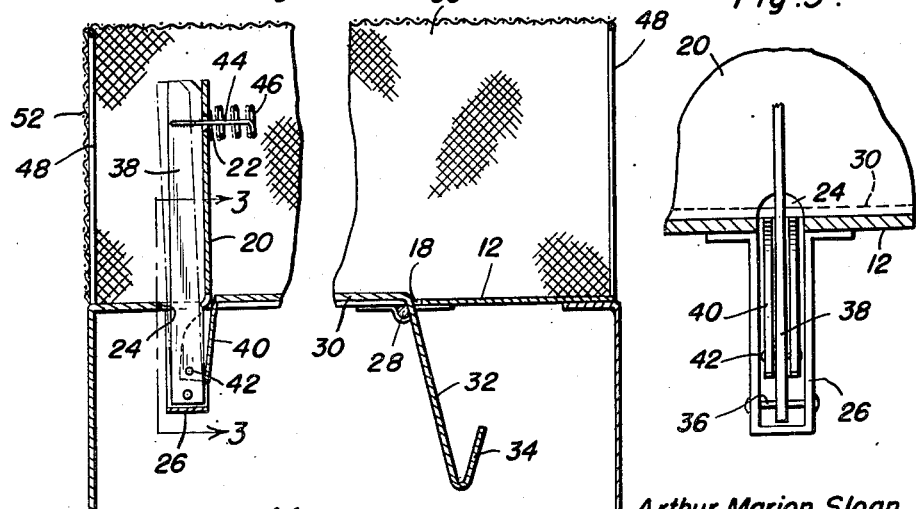
Arthur Marion Sloan
INVENTOR.

Patented May 8, 1951

2,551,908

UNITED STATES PATENT OFFICE 2,551,908

ANIMAL TRAP

Arthur Marion Sloan, Waco, Tex.

Application August 31, 1948, Serial No. 47,056

3 Claims. (Cl. 43—70)

This invention relates to an animal trap and has for its primary object to destroy animals such as rats, mice and the like.

Another object is to cause the animal to trip the trap while reaching for the bait which is used to entice the animal into the trap.

Another object is to deposit the animal in a container from which it cannot escape, and which container may contain water or a poison liquid which will effectively destroy the animal.

The above and other objects may be attained by employing this invention which embodies among its features a platform adapted to be supported over a vessel, said platform having an elongated rectangular opening therein, a trap door pivoted at one end adjacent one end of the opening, a counter-weight supported on the pivoted end of the trap door below the platform to move the trap door into a position to close the opening, a guard plate fixed to and extending upwardly from the platform adjacent the end of the opening remote from the pivoted end of the door, a latch bar pivotally mounted on the platform for movement toward and away from the guard plate, a latch carried by the latch bar below the platform to engage the underside of the door and hold the latter in elevated position, and a bait holder fixed to the latch bar adjacent its upper end and projecting through the guard plate toward the pivoted end of the door whereby an animal standing on the platform and contacting the bait holder will trip the latch bar and release the latch from door holding position.

Other features include arches extending upwardly from the platform adjacent opposite ends thereof and a hood supported on the arches in spaced relation to the platform to prevent the approach of an animal to the bait holder except along the trap door.

In the drawings:

Figure 1 is a perspective view of the trap embodying the features of this invention with the fabric removed, Figure 2 is a fragmentary longitudinal sectional view through the trap illustrated in Figure 1, Figure 3 is a transverse sectional view taken substantially along the line 3—3 of Figure 2, Figure 4 is a fragmentary perspective view of the latch bar showing the latch thereon, and Figure 5 is a fragmentary perspective view of the bait holder.

Referring to the drawings in detail this improved trap designated generally 10 comprises a platform 12 which is provided at opposite ends with angular extensions forming supporting legs 14 which are adapted to rest on opposite side edges of the walls of a suitable vessel 16 containing water, a caustic liquid or other suitable poisonous material for the destruction of the animal. The platform 12 is provided with an elongated longitudinally extending opening 18, and extending upwardly from the platform adjacent one end of the opening 18 is a guard plate 20 which is provided near its upper end with an opening 22 for the accommodation of the bait holder to be more fully hereinafter described. Formed in the platform and opening into the elongated rectangular opening 18 at the end thereof adjacent the guard plate is a slot 24 for the accommodation of the latch bar to be more fully hereinafter described. Soldered or otherwise secured to the underside of the platform 12 in straddling relation with the slot 24 is a U-shaped bracket 26 which forms the support for the latch bar to be more fully hereinafter described.

Pivotally supported on a transversely extending pivot bar 28 adjacent the end of the opening 18 in the platform 12 remote from the guard plate 20 is a trap door 30 which is of a size and shape to close the opening 18. The upper surface of the trap door 30 when the latter is in elevated position lies in a plane parallel with the upper surface of the platform 12, and carried at the pivoted end of the trap door 30 is an angular extension 32 which projects downwardly beneath the platform and supports a counter-weight 34 which is just sufficient to overbalance the weight of the door 30 so as to cause it to move into closed position when there is no weight thereon.

Pivotally supported on a pivot pin 36 which extends transversely through the U-shaped bracket 26 near the lower end thereof is a latch bar 38 which as illustrated in the drawings projects upwardly through the slot 24 to a point near the upper end of the guard plate 20. A latch dog 40 is pivotally supported at 42 on the latch bar 38 near its lower end, and being of transversely U-shaped configuration, and pivoted at a point which will provide a slight space between the bight portion of the latch dog and the adjacent edge of the latch bar 38, is susceptible to a limited rocking movement so that when the latch bar is in a vertical position and rests against the side of the guard plate 20 remote from the opening 18, the latch dog will engage the underside of the trap door 30 remote from the pivot 28. Fixed to the latch bar 38 adjacent its upper end and projecting through the opening 22 in the guard plate 20 is the shank 44 of a helical bait holder 46 which is supported on the end of the shank 44 remote from the latch bar 38, and in spaced relation to the guard plate 20 so as freely to move toward and away from the guard plate as suggested by the dotted lines in Figure 2.

In the preferred form of the invention the platform is provided adjacent opposite ends with arched supports 48 upon which a suitable covering 50 such as wire fabric or the like is supported in arched relation over the platform 12. The end of the arched shaped passage thus formed is preferably closed by an end panel 52 of material such as that forming the cover 50 to preclude access to the trap from the end of the platform adjacent the latch bar 38.

In use the trap is positioned over a suitable vessel, as suggested in Figure 1 and a suitable bait is introduced into the bait holder 46, after which the trap door 30 is moved to closed position so that the latch 40 will fall by its own weight about the axis of the pivot 42 into the position illustrated in Figure 2 to support the door in closed position so long as the latch bar 38 remains in contact with the guard plate 20. An animal entering through the open end of the arch way defined by the fabric 50 will be enticed into the trap by reason of the bait in the bait holder 46, and traversing platform 12, the animal will come to a position over the trap door 30, and reaching for the bait contained in the bait holder 46, will exert pressure on the bait holder and shank 44, thus moving the latch bar 38 into the dotted line position illustrated in Figure 2 so as to withdraw the latch 40 from its supporting position beneath the trap door. With the withdrawal of the latch 40 from trap door supporting position, the weight of the animal will be sufficient to overcome the effort of the counterweight 34 so that the trap door will swing about its pivot 28 and deposit the animal within the vessel 16. By reason of the fact that the counter-weight 34 is sufficient to overcome the weight of the trap door 30, it will be evident that the trap door will return to closing position with relation to the opening 18, and upon return of the latch bar 38 into guard plate contacting position the latch 40 will move beneath the edge of the trap door 30 remote from the pivot 28 to support the trap door in a position ready for a repeat operation. The helix 46 is preferably of sufficient length to engage the guard plate 20 so as to serve as a spring and cause the latch bar 38 to move into guard plate contacting position when the pressure of the animal's nose on the shank 44 is released. It will be noted upon inspection of Figure 2 that the latch dog 40 presents an inclined edge 41 in the travel path of the door when the latch dog is in the latching position, and that engagement of the door with such edge 41 during closure of the door will cam the latch dog 40 to pivot from the path of the door to permit the door to move to its closed position, after which the latch dog will gravitate to latching position about the pivot 42.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

1. In an animal trap of the type having a platform provided with an opening and a trap door pivoted to the platform normally closing the opening, a counterweight supported on the pivoted end of the door below the platform to move the door into a position to close the opening, a guard plate fixed to and extending upwardly from the platform adjacent the end of the opening remote from the pivoted end of the door, a latch bar, means pivotally supporting the latch bar on the platform on the side of the guard plate remote from the opening for movement toward and away from the guard plate, a latch dog carried by the latch bar below the platform to engage the under side of the door and hold the latter in elevated position, and a bait holder fixed to the latch bar adjacent its upper end and projecting through the guard plate toward the pivoted end of the door whereby an animal standing on the platform and contacting the bait holder will trip the latch bar and release the latch dog from door holding position.

2. In an animal trap of the type having a platform provided with an opening and a trap door pivoted to the platform and normally closing the opening, an improved latch means for engaging the underside of the trap door comprising a latch bar, a bracket depending from said platform, said platform having a slot, said latch bar being pivoted to said bracket and extending upwardly through said slot, and a latch dog pivoted to said latch bar eccentrically to its center of gravity whereby the latch dog will be gravity biased to its latching position, a portion of said latch dog engaging a portion of said trap door in the latching position of the trap.

3. The combination of claim 2, wherein said latch dog is provided with an edge inclined to and disposed in the path of travel of a portion of the trap door when the latch dog is in the latching position, whereby the latch dog pivots by the camming action of the door thereon during its closing movement to permit movement of said trap door to its latched position.

ARTHUR MARION SLOAN.

REFERENCES CITED

The following references are of record in the file of this patent:

UNITED STATES PATENTS

| Number | Name | Date |
| --- | --- | --- |
| 805,941 | Arnesen | Nov. 28, 1905 |
| 2,163,577 | Allen | June 27, 1939 |